(12) United States Patent
Choi et al.

(10) Patent No.: US 12,318,976 B2
(45) Date of Patent: Jun. 3, 2025

(54) MOLD FOR MANUFACTURING CRASH PAD AND CRASH PAD ASSEMBLY MANUFACTURED BY THE SAME

(71) Applicant: HYUNDAI MOBIS CO., LTD., Seoul (KR)

(72) Inventors: Ik Keun Choi, Yongin-si (KR); Young Jin You, Yongin-si (KR); Chang Wan Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/435,266

(22) Filed: Feb. 7, 2024

(65) Prior Publication Data

US 2025/0042070 A1    Feb. 6, 2025

(30) Foreign Application Priority Data

Aug. 1, 2023  (KR) .......................... 10-2023-0100549

(51) Int. Cl.
*B29C 45/14*     (2006.01)
*B29L 31/30*     (2006.01)
*B60R 21/215*    (2011.01)

(52) U.S. Cl.
CPC .. *B29C 45/14065* (2013.01); *B29C 45/14786* (2013.01); *B60R 21/215* (2013.01); *B29K 2713/00* (2013.01); *B29L 2031/3038* (2013.01)

(58) Field of Classification Search
CPC .......... B29C 2043/3216; B29C 70/688; B29C 70/687; B29C 65/364; B29C 65/344; B29C 2045/1427; B29C 45/14262; B29C 45/14196; B29C 2045/14098; B29C 45/14065
See application file for complete search history.

(56) References Cited

U.S. PATENT DOCUMENTS

2004/0043683 A1 *  3/2004  Muench ................ B29C 43/184
                                                     442/30

\* cited by examiner

*Primary Examiner* — Stella K Yi
(74) *Attorney, Agent, or Firm* — NSIP Law

(57) ABSTRACT

A mold for manufacturing a crash pad including a lower mold, the lower mold configured to receive a scrim and having grooves formed thereon to correspond to a shape of an inner surface of the crash pad and a shape of an airbag chute, an upper mold configured to be received by the lower mold and formed to correspond to a shape of an outer surface of the crash pad, and scrim fixing cores configured to be received by the lower mold, the lower mold including a scrim seating portion on which the scrim is seated, the scrim fixing cores being configured to be disposed on both side surfaces of the scrim seating portion when received by the lower mold, and the scrim fixing cores being configured to fix the scrim while at least partially adjoining the scrim seating portion in being received by the lower mold.

14 Claims, 4 Drawing Sheets

MOLD FOR MANUFACTURING CRASH PAD AND CRASH PAD ASSEMBLY MANUFACTURED BY THE SAME

CROSS-REFERENCE TO RELATED APPLICATION

This application claims the benefit under 35 USC § 119(a) of Korean Patent Application No. 10-2023-0100549, filed on Aug. 1, 2023, the entire disclosure of which is incorporated herein by reference for all purposes.

BACKGROUND

1. Field of the Invention

The present invention relates to a mold for manufacturing a crash pad and a crash pad assembly manufactured by the same, and more particularly, to a mold for manufacturing a crash pad, which prevents a scrim from being separated from the mold during a process of performing injection molding by inserting the scrim, and a crash pad assembly manufactured by the same.

2. Discussion of Related Art

An airbag (particularly, a passenger airbag (PAB)) serves to minimize an injury to an occupant in the event of a vehicle collision. The airbag is mounted in a crash pad, and when a door provided on the crash pad side is opened, a cushion is deployed to protect the occupant.

When the passenger airbag is deployed, a door portion of a crash door is opened toward a passenger so that the airbag is deployed. In this case, there is concern that the door portion of the airbag may be damaged by a deployment force of the airbag. Therefore, a scrim is provided to prevent the door portion from being damaged and separated toward the passenger. The scrim has a mesh structure provided in the form of a woven fabric sheet. The scrim is manufactured by insert injection molding and serves to hold the door portion of the airbag when the airbag is deployed.

Due to the nature of the unstable woven fabric sheet, it is difficult to seat a conventional scrim in a mold during the insert-injection molding. Further, during a process of injecting resin into the mold, the scrim is pushed or separated by a flow of the resin and exposed to a surface of the crash pad. Accordingly, it is important to stably fix the scrim onto the mold during the insert-injection molding.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a mold for manufacturing a crash pad including a lower mold, the lower mold configured to receive a scrim and having grooves formed thereon to correspond to a shape of an inner surface of the crash pad and a shape of an airbag chute, an upper mold configured to be received by the lower mold and formed to correspond to a shape of an outer surface of the crash pad, and scrim fixing cores configured to be received by the lower mold, the lower mold including a scrim seating portion on which the scrim is seated, the scrim fixing cores being configured to be disposed on both side surfaces of the scrim seating portion when received by the lower mold, and the scrim fixing cores being configured to fix the scrim while at least partially adjoining the scrim seating portion in being received by the lower mold.

The scrim fixing cores may be respectively disposed to face each other with the scrim seating portion interposed therebetween.

The scrim fixing cores may be configured to be moveable in a first direction inclined with respect to the lower mold.

The scrim fixing cores may include core protrusions that may be configured to protrude in a second direction to face each other and the core protrusions may be configured to come into contact with the scrim to fix the scrim.

The scrim fixing cores may be respectively configured to face each other to match respective central axes of the scrim fixing cores along the side surfaces of the scrim seating portion.

When the scrim fixing cores are moved toward an inside of the lower mold, in a third direction in which the scrim fixing cores become close to each other, the scrim fixing cores are configured come into contact with side surfaces of the scrim seating portion.

Respective lower surfaces of the scrim fixing cores may be bent downward such that when the scrim fixing core is moved to an inner boundary of the lower mold, the lower mold is disposed to be spaced apart from respective lower portions of the scrim fixing cores at a predetermined interval.

The airbag chute may be configured to include a vertical wall formed to produce while surrounding a peripheral portion of an airbag door of an airbag module.

The airbag door may be configured to correspond to the scrim seating portion.

The lower mold may be further configured to receive the scrim fixing cores.

In a general aspect, a crash pad assembly manufactured by the mold for manufacturing a crash pad includes a crash pad comprising an airbag door and a vertical wall configured to protrude while surrounding a peripheral portion of the airbag door, the crash pad assembly including a side surface hole defined therein in a side surface of the vertical wall and being formed in a first direction perpendicular to a second direction of the vertical wall, and a first shape the side surface hole is formed to correspond to second shapes of the scrim fixing cores.

An upper surface of the side surface hole may be formed to correspond to an upper surface of the vertical wall in a third direction in which the vertical wall extends.

The crash pad assembly may include a second crash pad disposed on an upper portion of the vertical wall, and an upper portion of the side surface hole and the second crash pad may be fixed by a fastener coupled in a lateral direction.

The crash pad assembly may include a coupling portion coupled to an airbag module, the coupling portion being formed on an outer surface of the vertical wall and one or more ribs configured to protrude from the outer surface of the vertical wall and to be connected to a respective surface of the crash pad.

In a general aspect, here is provided a crash pad assembly including a crash pad comprising an airbag door and a vertical wall configured to protrude while surrounding a peripheral portion of the airbag door, the crash pad assembly including a side surface hole defined therein in a side surface of the vertical wall and being formed in a first direction perpendicular to a second direction of the vertical wall.

An upper surface of the side surface hole may be formed to correspond to an upper surface of the vertical wall in a third direction in which the vertical wall extends.

The crash pad assembly may include a second crash pad disposed on an upper portion of the vertical wall and an upper portion of the side surface hole and the second crash pad may be fixed by a fastener coupled in a lateral direction.

The crash pad assembly may include a coupling portion coupled to an airbag module, the coupling portion being formed on an outer surface of the vertical wall and one or more ribs configured to protrude from the outer surface of the vertical wall and to be connected to a respective surface of the crash pad.

A first shape the side surface hole may be formed to correspond to a second shape of a scrim fixing core.

Figure 1:
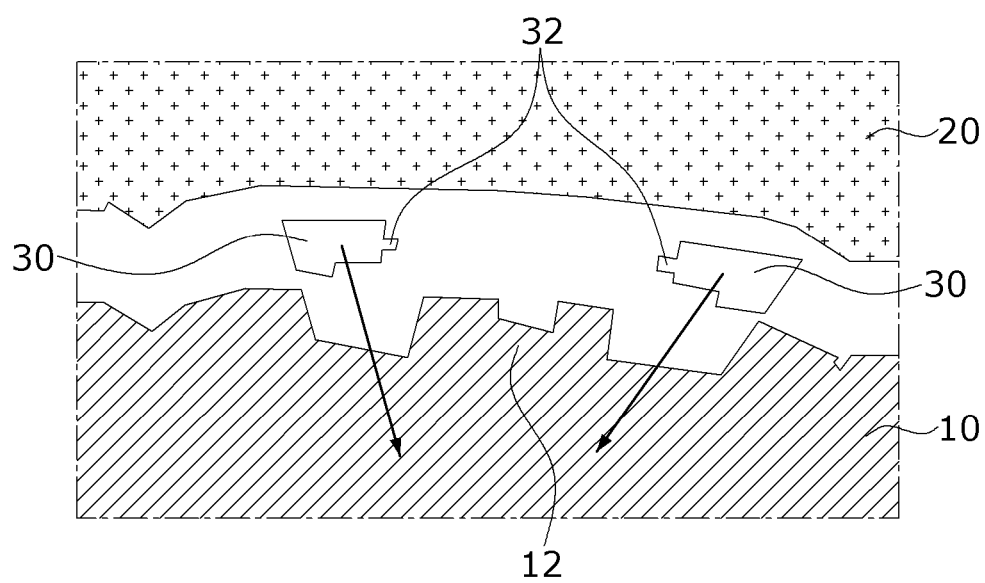
FIG. 1 is a view illustrating a mold for manufacturing a crash pad according to one embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The present invention is directed to providing a mold for manufacturing a crash pad, which enables a scrim to be seated in a mold without being separated from the mold during a process of manufacturing a crash pad into which a scrim is inserted, and a crash pad assembly manufactured by the mold and having a vertical wall that can be stably coupled to an airbag module.

Hereinafter, one embodiment of a mold for manufacturing a crash pad and a crash pad assembly manufactured by the same according to the present invention will be described in detail with reference to the accompanying drawings. In the description of the embodiments with reference to the accompanying drawings, the same or corresponding constituent elements are assigned with the same reference numerals regardless of reference numerals, and the repetitive description thereof will be omitted.

Figure 2:
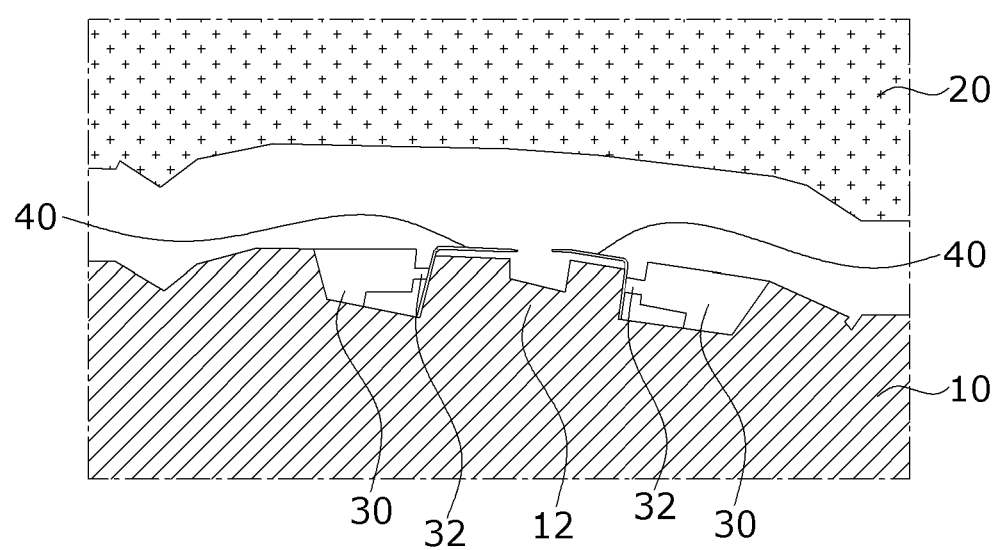
FIG. 2 is a view illustrating a state in which scrims are seated in the mold for manufacturing a crash pad according to one embodiment of the present invention.

FIG. 1 is a view illustrating a mold for manufacturing a crash pad according to one embodiment of the present invention, and FIG. 2 is a view illustrating a state in which scrims are seated in the mold for manufacturing a crash pad according to one embodiment of the present invention.

With reference to FIGS. 1 and 2, the mold for manufacturing a crash pad according to one embodiment of the present invention may include a lower mold 10. In an example, the lower mold 10 may be configured to receive scrims 40. The scrims 40 may be seated in the lower mold 10. The lower mold 10, on which scrims 40 are seated, may include grooves formed thereon to correspond to a shape of an inner surface of a crash pad 100 and a shape of an airbag chute. In addition, an upper mold 20 may be received by the lower mold 10 and be seated thereon. In addition the upper mold 20 may be formed to correspond to a shape of an outer surface of the crash pad 100, and scrim fixing cores 30 inserted into the lower mold 10.

The upper mold 20 and the lower mold 10 are in close contact with each other so that grooves formed in the upper and lower molds 20 and 10 may be filled with an injection-molding material. The grooves formed in the upper and lower molds 20 and 10 may correspond to a shape of a crash pad assembly. The lower mold 10 may have a scrim seating portion 12 on which the scrim 40 may be seated.

The scrim seating portion 12 may protrude from the inside of the lower mold 10 and may be formed to correspond to a shape of an empty space inside the airbag chute. The airbag chute may include a vertical wall 200 formed to protrude while surrounding a peripheral portion of an airbag door. A rear side of the airbag door is formed as an empty space surrounded by the vertical wall 200 such that the rear side of the airbag door corresponds to a shape of the scrim seating portion 12.

The crash pad assembly is manufactured by an insert-injection molding process so that the scrim 40 is inserted into the crash pad 100. The scrim 40 is inserted and disposed inside the rear side of the airbag door and the vertical wall 200. Therefore, after the scrim 40 is seated in the lower mold 10 first, the upper mold 20 comes into close contact with the lower mold 10, and the injection-molding material is injected such that the scrim 40 can be disposed inside the crash pad 100.

In the related art, a mold for manufacturing a crash pad has scrim fixing parts to hold the scrim 40 on both side surfaces of the scrim seating portion 12 that may move forward to protrude forward. When the scrim seating portion 12 moves forward, the scrim 40 is seated in the scrim seating portion 12. Thereafter, when the scrim seating portion 12 moves rearward, the scrim fixing parts gradually push and hold the scrim 40 in accordance with a motion of the scrim seating portion 12. In this case, there is a problem in that the scrim fixing parts may hold and fix the scrim 40 only after the scrim seating portion 12 is completely moved rearward.

When the scrim 40 cannot be properly seated in the lower mold, the scrim 40 may move in the mold or may be separated from the mold as the injection-molding material is injected into the mold. When the scrim 40 moves in the mold or is separated from the mold, the scrim 40 may be exposed to the outside of the crash pad 100, and the scrim 40 is fixed in a folded state. For this reason, when the airbag door is opened, the scrim 40 is withdrawn and separated from the airbag door without supporting the airbag door, which may cause damage to the crash pad 100 and the like.

The mold for manufacturing a crash pad according to the present embodiment may fix the scrim 40 by adopting the scrim fixing core 30 that may move in a direction inclined with respect to the lower mold. Inclined cores are disposed on both side surfaces of the scrim seating portion 12 and have core protrusions that protrude from surfaces of the scrim fixing cores 30, which face each other, in order to hold both side surfaces of the scrims 40.

The scrim fixing cores 30 are disposed to adjoin both side surfaces of the scrim seating portion 12 by moving in the direction inclined toward the inside of the lower mold 10. The core protrusions formed on the scrim fixing cores 30 may hold side surfaces of the scrims 40 while adjoining the scrim seating portion 12. When the scrim fixing core 30 moves in the direction inclined with respect to the lower mold 10, the scrim fixing core 30 may move toward the inside of the lower mold 10 so that a distance from the inside of the lower mold 10 gradually decreases. In this case, as the scrim fixing cores 30 move, the scrims 40 seated in the scrim seating portion 12 may be stably fixed as both side surfaces of the scrims 40 are pulled by the scrim fixing cores 30. The core protrusion may be formed to be parallel to a side surface of the scrim seating portion 12 such that the entire surface of the core protrusion formed in a direction in which the scrim seating portion 12 is disposed may adjoin the side surface of the scrim seating portion 12. In this case, a large area of the scrim 40 is fixed by the core protrusion such that the scrim 40 may be stably seated in the scrim seating portion 12.

The scrim fixing cores 30 may be provided as a pair facing each other. Alternatively, the scrim fixing cores 30 may be provided as a plurality of scrim fixing cores 30 disposed to face one another along the side surfaces of the scrim seating portion 12. The scrim fixing cores 30 may face each other so that central axes thereof are identical to each other. However, the scrim fixing cores 30 may face each other while being staggered at a predetermined distance. The arrangement of the scrim fixing cores 30 is not limited as long as the scrim fixing cores 30 may stably fix the scrims 40.

An upper surface of the scrim fixing core 30 may be disposed on the same plane as an upper surface of the lower mold 10. The upper surface of the lower mold 10 corresponds to a shape of a rear surface of the crash pad 100. In order to form a smooth shape of the rear surface of the crash pad 100 through the injection molding, the upper surface of the scrim fixing core 30 may be disposed on the same plane as the upper surface of the lower mold 10 when the scrim fixing core 30 is completely moved to the inside of the lower mold 10. That is, holes corresponding to the shape of the scrim fixing cores 30 are formed on both side surfaces of the scrim seating portion 12 formed on the lower mold 10 such that the scrim fixing cores 30 may be configured to be insertable and fit into the lower mold 10 and the lower mold 10 may be configured to receive the scrim fixing cores 30.

Because the scrim fixing core 30 moves in the direction inclined with respect to the lower mold 10, a surface of the scrim fixing core 30, which is opposite to the surface of the scrim fixing core 30 facing the scrim seating portion 12, may be formed in parallel with the movement direction of the scrim fixing core 30. In the case that the corresponding surface is formed in parallel with the movement direction of the scrim fixing core 30, the scrim fixing core 30 may be disposed without a gap with an inner surface of the lower mold 10 when the scrim fixing core 30 is moved toward the inside of the lower mold 10. Further, the scrim fixing core 30 may move without interfering with the lower mold 10 and the manufactured crash pad assembly when the scrim fixing core 30 moves to the outside of the lower mold 10.

A lower surface of the scrim fixing core 30 may be at least partially bent downward. As illustrated in the drawings, the lower surface of the scrim fixing core 30 may at least partially protrude downward. The bent/protruding portion may be a portion of the lower surface of the scrim fixing core 30 that is distant from the scrim seating portion 12. The scrim fixing core 30 is disposed inside the vertical wall 200 of the crash pad 100, which is manufactured by injection molding, and forms a hole corresponding to the shape of the scrim fixing core 30.

Since the vertical wall 200 receives a force generated by deployment pressure of an airbag module when an airbag is deployed, there may be a need for a structure capable of supporting the vertical wall 200 against the deployment pressure of the airbag module. Therefore, the hole, which corresponds to the shape of the scrim fixing core 30, is formed in the vertical wall 200, and an upper surface of the vertical wall 200 is formed to extend, which makes it possible to prevent the force applied to the vertical wall 200 from being concentrated on a particular portion. As illustrated in the drawings, in the case that a portion of the lower surface of the shape of the scrim fixing core 30, which is formed to be close to the scrim seating portion 12, is formed to be spaced apart from the lower mold 10 at a predetermined distance, the corresponding portion is filled with the injection-molding material such that the upper surface of the vertical wall 200 may be formed.

Figure 3:
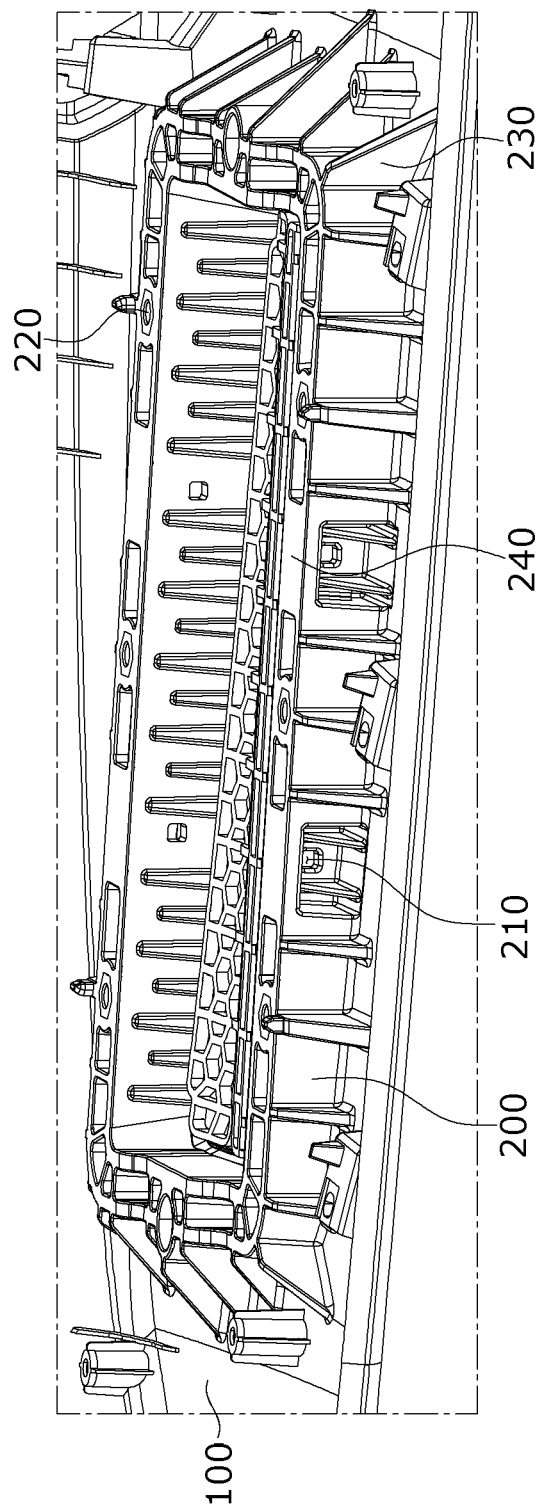
FIG. 3 is a view illustrating a crash pad assembly manufactured by the mold for manufacturing a crash pad according to one embodiment of the present invention.

FIG. 3 is a view illustrating the crash pad assembly manufactured by the mold for manufacturing a crash pad according to one embodiment of the present invention.

With reference to FIG. 3, the crash pad assembly manufactured by the mold for manufacturing a crash pad according to one embodiment of the present invention may include the crash pad 100 formed with the airbag door, the vertical wall 200 protruding while surrounding the peripheral portion of the airbag door, and side surface holes 210 formed in a side surface of the vertical wall 200 in a direction perpendicular to the vertical wall 200.

The side surface holes 210 are formed by injecting the injection-molding material in a state in which the scrim fixing cores 30 are disposed during the process of injecting the injection-molding material. A shape of the side surface holes 210 may correspond to the shape of the scrim fixing core 30. The crash pad assembly is manufactured in the state in which the lower surface of the scrim fixing core 30 is at least partially spaced apart from the lower mold. Therefore, the upper surface of the side surface holes 210 may have a shape which corresponds to a direction in which the upper surface of the vertical wall 200 extends. In the case that the upper surface of the vertical wall 200 extends in a state in which an upper side of the side surface hole 210 is not opened, the pressure, which is applied to the vertical wall 200 while the airbag is deployed, may be dispersed and transmitted to the entire vertical wall 200. That is, it is possible to prevent a situation in which when the airbag is deployed, the pressure is concentrated at a particular point on the vertical wall 200, and the crash pad 100 and the vertical wall 200 are damaged.

The airbag module may be seated and coupled onto an upper side of the vertical wall 200. In order to couple the vertical wall 200 to the airbag module, coupling portions 220 may be formed on an outer surface of the vertical wall 200. An insert nut is inserted into an inner hole of the coupling portion 220, and a bolt penetrates the airbag module such that the airbag module and the coupling portion 220 may be integrally fixed. In the present embodiment, the vertical wall 200 has a dual wall structure, and the coupling portions 220 are formed in central portions of inner and outer walls. The vertical wall 200 is not limited as long as the vertical wall 200 may be coupled to the airbag module and support the airbag module so that the airbag door may be stably opened when the airbag is deployed. The vertical wall 200 may have a single-wall structure or a multi-wall structure.

Ribs 230 may be disposed to protrude from the outer surface of the vertical wall 200 and connected to one surface of the crash pad 100. The ribs 230 may be provided as a plurality of ribs 230 disposed along the outer surface of the vertical wall 200. The ribs 230 may serve to support the vertical wall 200 when the pressure is applied to the vertical wall 200 when the airbag is deployed. The rib 230 may at least partially protrude from the outer surface of the vertical wall 200. The shape of the rib 230 is not limited as long as the rib 230 may support the vertical wall 200. In the present embodiment, the rib 230 protrudes in a right-angled triangular shape to the outside of the vertical wall 200 and is connected to one surface of the crash pad 100.

Figure 4:
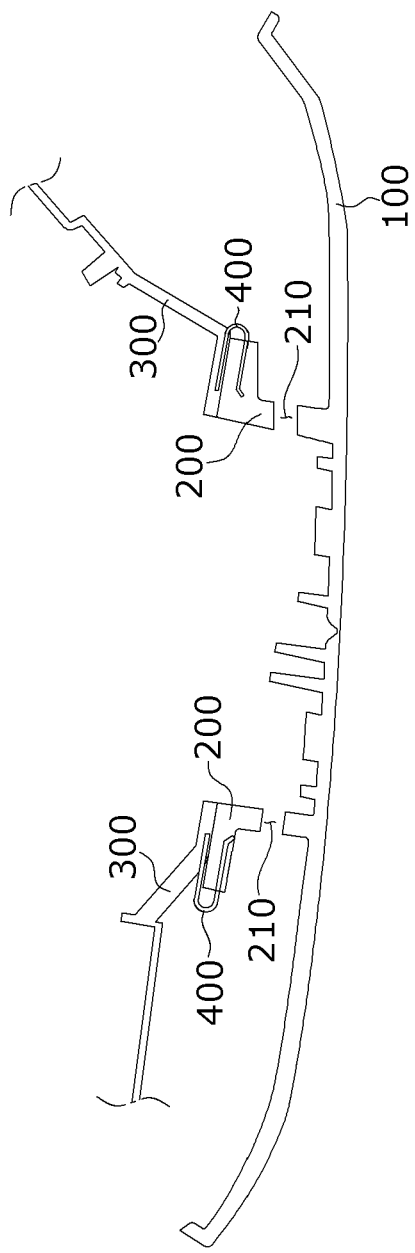
FIG. 4 is a view illustrating a cross-section of the crash pad assembly manufactured by the mold for manufacturing a crash pad according to one embodiment of the present invention.

FIG. 4 is a view illustrating a cross-section of the crash pad assembly manufactured by the mold for manufacturing a crash pad according to one embodiment of the present invention.

With reference to FIG. 4, the crash pad assembly manufactured by the mold for manufacturing a crash pad according to one embodiment of the present invention may further include a second crash pad 300 disposed on an upper portion of the vertical wall 200. The second crash pad 300 is disposed inside the crash pad 100, coupled to an upper portion of the vertical wall 200, and serves to protect components disposed inside the crash pad 100.

The second crash pad 300 may be coupled to an upper side of a vertical hole. In the case of a crash pad assembly used in the related art, the vertical wall 200 includes multiple walls, a nut is inserted into a space between the multiple walls, the second crash pad 300 is disposed at an upper side of the vertical wall 200, and then a bolt is fastened to fix the vertical wall 200 and the second crash pad 300. However, in this case, there is a problem in that a fastening force decreases when the airbag is deployed at a high temperature.

In the case of the crash pad assembly according to the present embodiment, the side surface holes 210 are formed in the vertical wall 200 so that fasteners 400, which may be inserted into the side surface holes 210 from side surfaces of the side surface hole 210, may be applied to fix the vertical wall 200 and the second crash pad 300. Like a clip, the fastener 400 may be fitted between the upper surface of the side surface hole 210 and the second crash pad 300 and fix the vertical wall 200 and the second crash pad 300. In the case that the fastener 400, which is inserted from left and right sides and fixes the vertical wall 200 and the second crash pad 300, is applied, it is possible to relatively advantageously cope with the high-temperature deployment in comparison with a case in which the vertical wall 200 and the second crash pad 300 are fixed by bolt-nut fastening.

A coupling hole may be formed at an upper side of the side surface hole 210 and coupled to the second crash pad 300. The coupling hole may be formed by a separate process after the crash pad assembly is manufactured by insert-injection molding. However, a protrusion having a shape, which corresponds to the coupling hole, may be formed on the lower surface of the scrim fixing core 30, and the hole may be formed so that the injection-molding material cannot enter a portion corresponding to the protrusion.

According to one embodiment of the present invention, a scrim fixing core, which can be moved in a direction inclined toward the inside of a lower mold, fix a scrim while adjoining both sides of the scrim seated in a scrim seating portion, thereby preventing the scrim from being separated from the mold during an insert-injection molding process. Side surface holes, which correspond to the shapes of the scrim fixing cores, are formed in the vertical wall of the crash pad assembly manufactured by the mold by injection molding such that an airbag module and the vertical wall can be fixed by fasteners.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mold for manufacturing a crash pad, the mold comprising:
   a lower mold, the lower mold configured to receive a scrim and having grooves formed thereon to correspond to a shape of an inner surface of the crash pad and a shape of an airbag chute;
   an upper mold configured to be received by the lower mold and formed to correspond to a shape of an outer surface of the crash pad; and
   scrim fixing cores configured to be received by the lower mold,
   wherein the lower mold includes a scrim seating portion on which the scrim is seated,
   wherein the scrim fixing cores are configured to be disposed on both side surfaces of the scrim seating portion when received by the lower mold, and
   wherein the scrim fixing cores are configured to fix the scrim while at least partially adjoining the scrim seating portion in being received by the lower mold.

2. The mold of claim 1, wherein the scrim fixing cores are respectively disposed to face each other with the scrim seating portion interposed therebetween.

3. The mold of claim 2, wherein the scrim fixing cores are configured to be moveable in a first direction inclined with respect to the lower mold.

4. The mold of claim 2, wherein the scrim fixing cores include core protrusions configured to protrude in a second direction to face each other, and
   wherein the core protrusions are configured to come into contact with the scrim to fix the scrim.

5. The mold of claim 4, wherein the scrim fixing cores are respectively configured to face each other to match respective central axes of the scrim fixing cores along the side surfaces of the scrim seating portion.

6. The mold of claim 4, wherein when the scrim fixing cores are moved toward an inside of the lower mold, in a third direction in which the scrim fixing cores become close to each other, the scrim fixing cores are configured to come into contact with side surfaces of the scrim seating portion.

7. The mold of claim 6, wherein respective lower surfaces of the scrim fixing cores are bent downward such that when the scrim fixing core is moved to an inner boundary of the lower mold, the lower mold is disposed to be spaced apart from respective lower portions of the scrim fixing cores at a predetermined interval.

8. The mold of claim 1, wherein the airbag chute is configured to include a vertical wall formed to produce while surrounding a peripheral portion of an airbag door of an airbag module.

9. The mold of claim 8, wherein the airbag door is configured to correspond to the scrim seating portion.

10. The mold of claim 1, wherein the lower mold is further configured to receive the scrim fixing cores.

11. A crash pad assembly manufactured by the mold for manufacturing a crash pad according to claim 1, the crash pad assembly comprising:
- a crash pad comprising an airbag door; and
- a vertical wall configured to protrude while surrounding a peripheral portion of the airbag door,
- wherein the crash pad assembly includes a side surface hole defined therein in a side surface of the vertical wall and being formed in a first direction perpendicular to a second direction of the vertical wall, and
- wherein a first shape the side surface hole is formed to correspond to second shapes of the scrim fixing cores.

12. The crash pad assembly of claim 11, wherein an upper surface of the side surface hole is formed to correspond to an upper surface of the vertical wall in a third direction in which the vertical wall extends.

13. The crash pad assembly of claim 11, further comprising a second crash pad disposed on an upper portion of the vertical wall,
- wherein an upper portion of the side surface hole and the second crash pad are fixed by a fastener coupled in a lateral direction.

14. The crash pad assembly of claim 11, further comprising:
- a coupling portion coupled to an airbag module, the coupling portion being formed on an outer surface of the vertical wall; and
- one or more ribs configured to protrude from the outer surface of the vertical wall and to be connected to a respective surface of the crash pad.

* * * * *